United States Patent
Balasubramani et al.

(10) Patent No.: US 12,474,940 B2
(45) Date of Patent: Nov. 18, 2025

(54) SYSTEM AND METHOD FOR VALIDATING A POWER CYCLE FOR AN EMULATED PCIe BASED STORAGE DEVICE

(71) Applicant: SAMSUNG ELECTRONICS CO., LTD., Suwon-si (KR)

(72) Inventors: Muthazhagan Balasubramani, Bengaluru (IN); Appalanaidu Gollu, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 821 days.

(21) Appl. No.: 17/844,831

(22) Filed: Jun. 21, 2022

(65) Prior Publication Data

US 2023/0115629 A1    Apr. 13, 2023

(30) Foreign Application Priority Data

Oct. 7, 2021    (IN) .............................. 202141045777

(51) Int. Cl.
*G06F 9/455* (2018.01)
*G06F 13/42* (2006.01)

(52) U.S. Cl.
CPC ...... *G06F 9/45504* (2013.01); *G06F 13/4221* (2013.01); *G06F 2213/0026* (2013.01)

(58) Field of Classification Search
CPC ............. G06F 9/45504; G06F 13/4221; G06F 9/4411; G06F 9/45558
See application file for complete search history.

(56) References Cited

U.S. PATENT DOCUMENTS

| | | | |
|---|---|---|---|
| 9,195,585 B2 | 11/2015 | Phelan et al. | |
| 9,936,059 B2 | 4/2018 | Gorajala Chandra et al. | |
| 2013/0086416 A1* | 4/2013 | Kopylovitz | G06F 11/0727 714/6.11 |
| 2020/0064903 A1* | 2/2020 | Blodgett | G06F 1/3275 |
| 2021/0149757 A1* | 5/2021 | Ozturk | G06F 11/0796 |
| 2022/0206821 A1* | 6/2022 | Devegowda | G06F 9/4401 |

* cited by examiner

*Primary Examiner* — Brian W Wathen
(74) *Attorney, Agent, or Firm* — Morgan, Lewis & Bockius LLP

(57) ABSTRACT

A system for validating a power cycle for an emulated Peripheral Component Interconnect express (PCIe) storage device, the system including: an emulating and virtualizing unit hosting a virtual machine; a PCIe bridge device; and emulated PCIe storage devices, wherein the PCIe bridge device: receives a bridge register value that indicates a "Power ON" or "Power OFF" condition; receives a request from the virtual machine to perform actions corresponding to the bridge register value; detects a condition associated with the bridge register value; performs the actions corresponding to the detected condition on the emulated PCIe storage devices to emulate the "Power ON" or "Power OFF" condition for the emulated PCIe storage devices; and validates a power cycle of the emulated PCIe storage devices based on a pre-stored vendor value and a corresponding pre-stored condition for the emulated "Power ON" or "Power OFF" condition for the emulated PCIe storage devices.

9 Claims, 5 Drawing Sheets

SYSTEM AND METHOD FOR VALIDATING A POWER CYCLE FOR AN EMULATED PCIe BASED STORAGE DEVICE

CROSS-REFERENCE TO RELATED APPLICATION

This application claims priority under 35 U.S.C. § 119 to Indian Patent Application No. 202141045777, filed on Oct. 7, 2021, the disclosure of which is incorporated by reference herein in its entirety.

TECHNICAL FIELD

The present inventive concept relates generally to emulated storage devices, and more particularly, but not exclusively to a system and method for validating a power cycle for an emulated Peripheral Component Interconnect express (PCIe) based storage device.

DISCUSSION OF RELATED ART

A non-volatile memory device is a type of computer memory that can retain stored data even after power is removed. Peripheral Component Interconnect express (PCIe) based storage devices may be used to store various types of data. A Solid-State Device (SSD) may also be used to store data persistently. The SSD comprises a System-on-a-Chip (SoC) and operates using an internal SSD firmware that provides access to user data read and write operations via a look up table.

Non-volatile memory storage such as SSDs require validation to ensure the correct functioning of the SSD and also to ensure that there are zero development issues at a controller or subsystem level. Performing such validation after the SSD has been manufactured may not be efficient in terms of cost and time factors. This in turn may delay the product delivery cycle. Accordingly, existing techniques perform such validation prior to the manufacturing of the SSD by using emulated SSDs. Emulated SSDs are a software modeled real Application-Specific Integrated Circuit (ASIC)/Firmware engine, which enables 'as-is' usage of real SSD. For instance, emulators and virtualizers such as Quick Emulators (QEMU) may be used by SSD manufacturers to quicken the product delivery cycle. The emulators and virtualizers such as QEMU enable the complete functionality of the SSD to get validated/verified before the actual SSD is available. Although the existing techniques are able to validate/verify various features of the SSD prior to the manufacture of the SSD, there are feature validation gaps that the existing emulators and virtualizers such as QEMU cannot address, such as but not limited to, a Power Cycle (e.g., Normal Shutdown and Abrupt Shutdown), of the SSD. By validating/verifying such features, SSD manufacturers may be able to address all of the possible validation gaps.

Current techniques that use virtual machines installed with a guest operating system to operate/validate the emulated SSD cannot initiate a power cycle for an emulated SSD. Lack of this ability to initiate such features for an emulated SSD, reduces feature gap coverage, thereby resulting in inefficient validation of the emulated SSDs prior to manufacturing and delay in product delivery life cycle. Currently, virtual machines have the functionality of storing user data of the virtual machine to a backend storage of QEMU when the virtual machine is powered off and retrieving the user data from the backend storage when the virtual machine is powered on. This creates an illusion that the virtual machine is a non-volatile memory storage. However, this technique does not validate the PCIe transport level layer for power cycles of an emulated non-volatile memory storage such as an emulated SSD.

Therefore, there exists a need for a system that enables validation of the power cycle for an emulated SSD.

SUMMARY

An embodiment of the present inventive concept provides a system for validating a power cycle for an emulated Peripheral Component Interconnect express (PCIe) based storage device, the system including: an emulating and virtualizing unit configured to host a virtual machine that includes a guest Operating System (OS); a PCIe bridge device communicatively coupled to the virtual machine; and one or more emulated PCIe based storage devices communicatively coupled to the PCIe bridge device, wherein the PCIe bridge device is configured to: receive a bridge register value to be written into a bridge register from the virtual machine, wherein the bridge register value indicates a "Power ON" condition or a "Power OFF" condition; receive a request from the virtual machine to perform one or more actions corresponding to the bridge register value; detect a condition associated with the bridge register value by mapping the bridge register value with a pre-stored vendor value and a corresponding pre-stored condition; perform the one or more actions corresponding to the detected condition associated with the bridge register value on the one or more emulated PCIe based storage devices to emulate the "Power ON" condition or the "Power OFF" condition for the one or more emulated PCIe based storage devices; and validate a power cycle of the one or more emulated PCIe based storage devices based on the pre-stored vendor value and the corresponding pre-stored condition for the emulated "Power ON" condition or the "Power OFF" condition for the one or more emulated PCIe based storage devices.

An embodiment of the present inventive concept provides a method of validating a power cycle for an emulated PCIe based storage device, the method including: receiving, at a PCIe bridge device communicatively coupled to a virtual machine hosted by an emulating and virtualizing unit, a bridge register value to be written into a bridge register from the virtual machine, wherein the bridge register value indicates a "Power ON" condition or a "Power OFF" condition; receiving, at the PCIe bridge device, a request from the virtual machine to perform one or more actions corresponding to the bridge register value; detecting, by the PCIe bridge device, a condition associated with the bridge register value by mapping the bridge register value with a pre-stored vendor value and a corresponding pre-stored condition; performing, by the PCIe bridge device, the one or more actions corresponding to the detected condition associated with the bridge register value on one or more emulated PCIe based storage devices communicatively coupled to the PCIe bridge device, to emulate the "Power ON" condition or the "Power OFF" condition for the one or more emulated PCIe based storage devices; and validating, by the PCIe bridge device, a power cycle of the one or more emulated PCIe based storage devices based on the pre-stored vendor value and the corresponding pre-stored condition for the emulated "Power ON" condition or the "Power OFF" condition for the one or more emulated PCIe based storage devices.

BRIEF DESCRIPTION OF THE DRAWINGS

The same numbers are used throughout the figures to reference like features and components. Embodiments of the present inventive concept are now described, by way of example, with reference to the accompanying figures, in which.

DETAILED DESCRIPTION OF THE EMBODIMENTS

Figure 1:
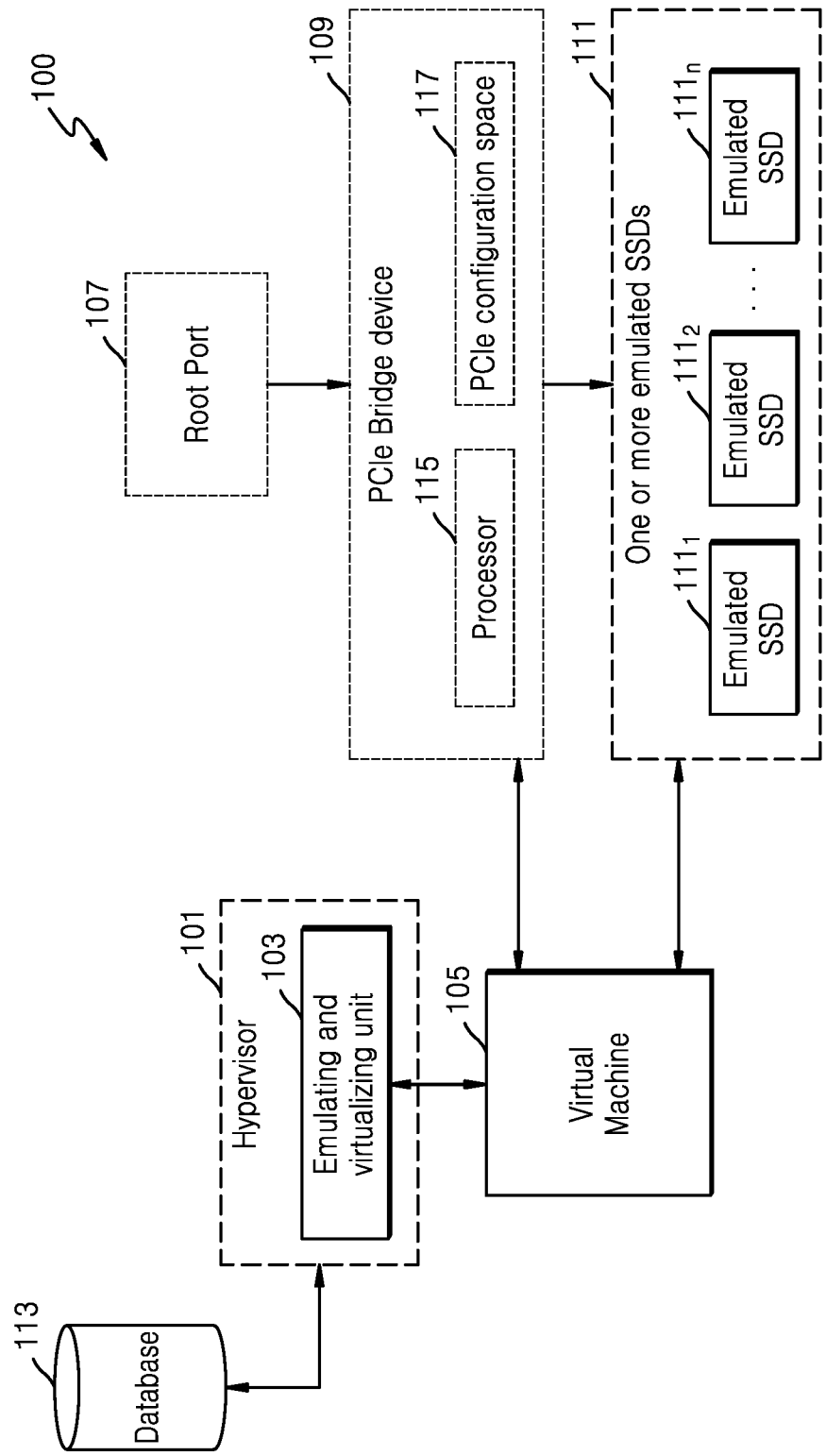
FIG. 1 shows an system for validating a power cycle for an emulated Peripheral Component Interconnect express (PCIe) based storage device such as an emulated Solid State Device (SSD) in accordance with some embodiments of the present inventive concept.

In the present document, the word "exemplary" may mean "serving as an example, instance, or illustration." Any embodiment or implementation of the present inventive concept described herein as "exemplary" is not necessarily to be construed as preferred or advantageous over other embodiments.

While the disclosure is subject to various modifications and alternative forms, specific embodiments thereof are shown by way of example in the drawings and will be described in detail below. It should be understood, however that these embodiments are not intended to limit the disclosure to the forms disclosed, but on the contrary, the disclosure is intended to cover all modifications, equivalents, and alternative falling within the scope of the present inventive concept.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup, device or method. In other words, one or more elements in a system or apparatus proceeded by "comprises . . . a" does not preclude the existence of other elements or additional elements in the system or method.

Disclosed herein are a system and method for validating a power cycle for an emulated Peripheral Component Interconnect express (PCIe) based storage device such as an emulated Solid State Device (SSD), according to embodiments of the present inventive concept. The present inventive concept will be explained in terms of an emulated SSD, which is one of the examples of emulated PCIe based storage devices. However, the present inventive concept should not be limited thereto since the system and method of the present inventive concept are applicable for PCIe based storage devices other than SSDs such as Network cards, Graphic cards, Universal Serial Bus (USB) and the like. Therefore, the phrases "emulated PCIe based storage devices" and "emulated SSDs" are used interchangeably in the present disclosure. The system according to an embodiment of the present inventive concept may include, but is not limited to, an emulating and virtualizing unit, a PCIe bridge device, and one or more emulated SSDs. In some embodiments of the present inventive concept, the emulating and virtualizing unit may host a virtual machine which is installed with a guest Operating System (OS). An example of the emulating and virtualizing unit may be a Quick Emulator (QEMU) that runs on a hypervisor. In some embodiments of the present inventive concept, the hypervisor may allocate configurations such as a required number of Central Processing Units (CPUs) and a memory system to host the virtual machine with the guest OS. In some embodiments of the present inventive concept, the PCIe bridge device may be communicatively connected to the virtual machine. The PCIe bridge device may include a 4096 byte PCIe configuration space. Further, the one or more emulated SSDs may be communicatively connected to the PCIe bridge device. In some embodiments of the present inventive concept, the one or more emulated SSDs may be communicatively connected to the PCIe bridge device by specifying a Bus-Device-Function (BDF) of the PCIe bridge device. In some embodiments of the present inventive concept, the PCIe bridge device may act as a bridge between a root port of a PCIe tree and the one or more emulated SSDs. In other words, the PCIe bridge device may be a child node of the root port of the PCIe tree and the one or more emulated SSDs may be child nodes of the PCIe bridge device.

In some embodiments of the present inventive concept, the PCIe bridge device may receive a bridge register value to be written into a bridge register, from the virtual machine. The bridge register value may indicate one of a "Power ON" condition or a "Power OFF" condition. Upon receiving the bridge register value, the PCIe bridge device may then receive a request from the virtual machine to perform one or more actions corresponding to the bridge register value. The request from the virtual machine may trigger the PCIe bridge device to detect a condition associated with the bridge register value. In some embodiments of the present inventive concept, the condition associated with the bridge register value may be detected by mapping the bridge register value with a pre-stored vendor specific value and a corresponding pre-stored condition. In some embodiments of the present inventive concept, upon detecting the condition associated with the bridge register value based on the mapping, the PCIe bridge device may perform the one or more actions corresponding to the detected condition associated with the bridge register value on one or more emulated SSDs communicatively connected to the PCIe bridge device, to emulate one of the "Power ON" condition or the "Power OFF" condition for the one or more emulated SSDs. Thereafter, the PCIe bridge device may validate a power cycle for the one or more emulated SSDs based on the emulated one of the "Power ON" or the "Power OFF" condition for the one or more emulated SSDs.

The present inventive concept enables initiating the power cycle of the one or more emulated SSDs. This in turn enables the present inventive concept to allow validation of the power cycle of the one or more emulated SSDs before manufacturing the actual SSDs, thereby speeding and improving the product delivery cycle. Additionally, such validation of the power cycle of the one or more emulated SSDs helps avoid multiple Application-Specific Integrated Circuit (ASIC)/firmware bugs after the Make to Order (MTO), thereby preventing the occurrence of hidden power cycle related issues in the manufactured SSDs. In addition, the present inventive concept provides the ability to perform the method using any virtualization platforms, and enables the complete specification of the emulated SSDs to be validated.

A description of an embodiment of the present inventive concept with several components in communication with each other does not imply that all such components are required. This is so, because a variety of optional components are herein described to illustrate the wide variety of possible embodiments of the inventive concept.

FIG. 1 shows a system for validating a power cycle for an emulated PCIe based storage device such as an emulated SSD in accordance with some embodiments of the present inventive concept.

The system 100 includes a hypervisor 101, an emulating and virtualizing unit 103, a virtual machine 105, a root port 107, a PCIe bridge device 109, an emulated SSD $111_1$ to an emulated SSD $111_n$ (also referred as one or more emulated SSDs 111) and a database 113. In some embodiments of the present inventive concept, the hypervisor 101 may allocate configurations such as a required number of Central Processing Units (CPUs) and a memory system to the virtual machine 105. In some embodiments of the present inventive concept, the virtual machine 105 may be installed with a guest Operating System (OS). An example of the emulating and virtualizing unit 103 may be a Quick Emulator (QEMU). Further, in some embodiments of the present inventive concept, the root port 107 may be a first parent node of a PCIe tree that initializes and manages PCIe fabric. The root port 107 may have multiple child nodes. In some embodiments of the present inventive concept, each child node of the root port 107 may be one of the PCIe bridge device 109 or the emulated SSD $111_n$ (also referred as an endpoint device $111_n$). The one or more emulated SSDs 111 may be last child nodes of the PCIe tree. In this case, the one or more emulated SSDs 111 may be referred to as the one or more endpoint devices 111. As an example, the one or more emulated SSDs 111 or the one or more endpoint devices 111 may include, but are not limited to, Non-Volatile Memory express (NVMe), Serial Advanced Technology Attachment (SATA), Serial-Attached Small Computer System Interface (SCSI) (SAS), Universal Serial Bus (USB) and the like. Further, the one or more emulated SSDs 111 may expose a Memory Mapped Input/Output (MMIO) register space to the root port 107 for allowing the virtual machine 105 to perform read and write operations.

In some embodiments of the present inventive concept, the PCIe bridge device 109 may be communicatively connected to the virtual machine 105. As an example, the PCIe bridge device 109 may be a Type 1 bridge device, that may enable the PCIe bridge device 109 to be communicatively connected to more than one emulated SSD $111_n$. In some embodiments of the present inventive concept, the PCIe bridge device 109 may include a 4096 byte PCIe configuration space. In some embodiments of the present inventive concept, each of the PCIe bridge device 109 connected to the root port 107 may expose a respective PCIe configuration register space. Further, in some embodiments of the present inventive concept, the one or more emulated SSDs 111 may be communicatively connected to the PCIe bridge device 109, by specifying a Bus-Device-Function (BDF) of the PCIe bridge device 109. The PCIe bridge device 109 may act as a bridge between the root port 107 of the PCIe tree and the one or more emulated SSDs 111 communicatively connected to the PCIe bridge device 109.

The PCIe bridge device 109 may include a processor 115, and a PCIe configuration space 117. In some embodiments of the present inventive concept, a memory may be part of the PCIe configuration space 117. The PCIe configuration space 117 may be configured to receive a bridge register value to be written into a bridge register, from the virtual machine 105. The bridge register value may indicate one of a "Power ON" condition or a "Power OFF" condition. As an example, the bridge register value "1" may indicate the "Power ON" condition and the bridge register value "0" may indicate the "Power OFF" condition. In the alternative, the bridge register value "0" may indicate the "Power ON" condition and the bridge register value "1" may indicate the "Power OFF" condition. Upon receiving the bridge register value, the virtual machine 105 may perform one or more actions corresponding to the bridge register value. The request received from the virtual machine 105 may trigger the processor 115 to detect a condition associated with the bridge register value. In some embodiments of the present inventive concept, the condition associated with the bridge register value may be detected by mapping the bridge register value with a pre-stored vendor specific value and a corresponding pre-stored condition. In some embodiments of the present inventive concept, upon detecting the condition associated with the bridge register value based on the mapping, the processor 115 may perform the one or more actions corresponding to the detected condition associated with the bridge register value on one or more emulated SSDs ill communicatively connected to the PCIe bridge device 109, to emulate one of the "Power ON" condition or the "Power OFF" condition for the one or more emulated SSDs 111. As an example, the one or more actions associated with the "Power ON" condition may include, but are not limited to, at least one of creating PCIe capabilities, allocating resources required for Base Address Registers (BARs), initializing PCIe registers and controller specific registers with default values as per a specification, performing a controller initialization sequence, and exposing PCIe and controller register space to the guest OS of the virtual machine 105. As an example, the one or more actions associated with the "Power OFF" condition may include, but are not limited to, at least one of removing PCIe capabilities, revoking Memory Mapped Input/Output (MMIO) access, transferring outstanding data to a database associated with the virtual machine 105, clearing controller specific registers, performing a controller un-initialization sequence, and concealing PCIe and controller register space to the guest OS of the virtual machine 105. Thereafter, the processor 115 may validate a power cycle of the one or more emulated SSDs 111 based on the pre-stored vendor specific value and the corresponding pre-stored condition for one of the emulated "Power ON" or the "Power OFF" conditions for the one or more emulated SSDs 111. In some embodiments of the present inventive concept, upon performing the one or more actions on the one or more emulated SSDs 111, the processor 115 may reset the bridge register by clearing the bridge register value written into the bridge register.

Figure 2A:
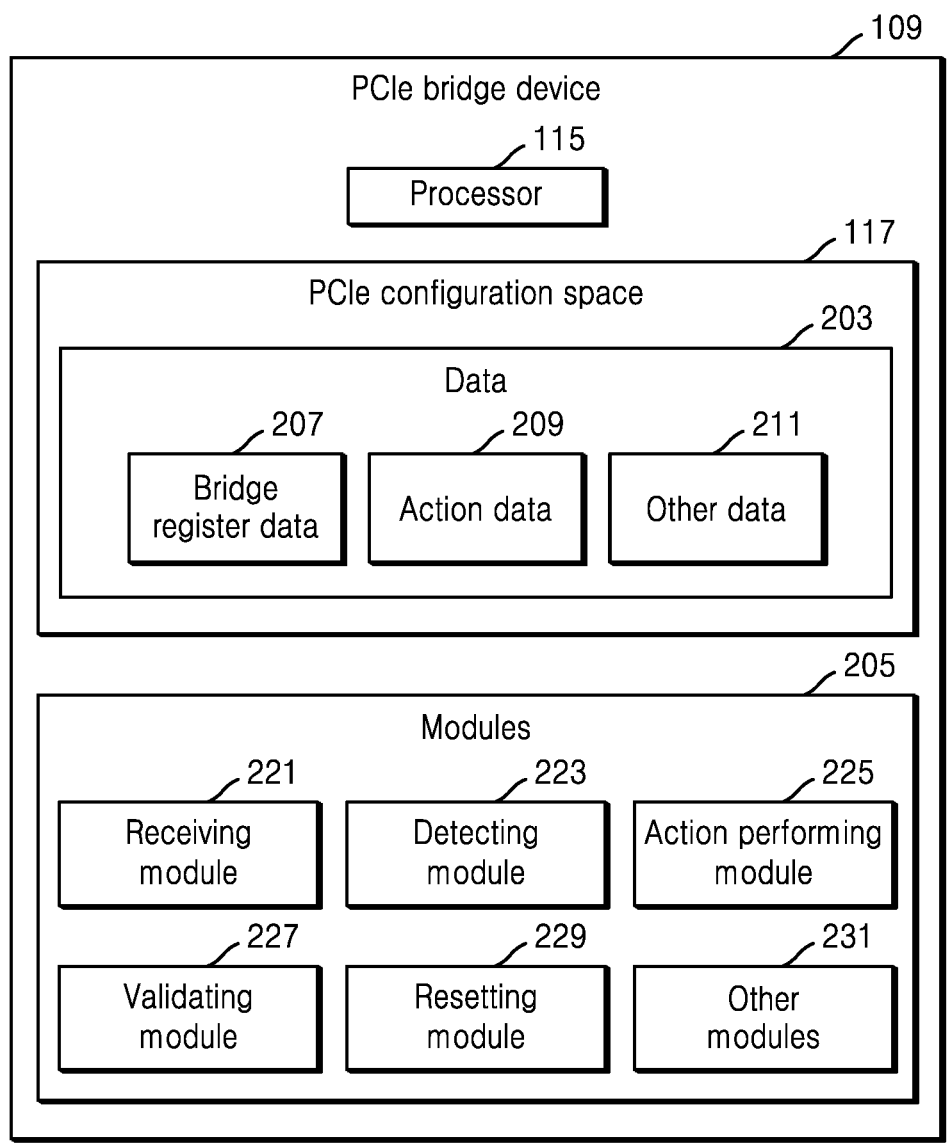
FIG. 2A shows a block diagram of a PCIe bridge device for validating a power cycle for an emulated PCIe based storage device such as an emulated SSD in accordance with some embodiments of the present inventive concept.

FIG. 2A shows a block diagram of a PCIe bridge device 109 for validating a power cycle for an emulated PCIe based storage device such as an emulated SSD in accordance with some embodiments of the present inventive concept.

In some embodiments of the present inventive concept, the PCIe bridge device 109 may include data 203 and modules 205. As an example, the data 203 is stored in the memory configured in the PCIe bridge device 109 as shown in FIG. 2A. In one embodiment of the present inventive concept, the data 203 may include bridge register data 207, action data 209, and other data 211. The modules 205 of FIG. 2A are described hereinafter in detail.

In some embodiments of the present inventive concept, the data 203 may be stored in the memory of the PCIe configuration space 117 in various data structures. Additionally, the data 203 can be organized using data models, such as relational or hierarchical data models. The other data 211 may include temporary data and temporary files, generated by the modules 205 for performing the various functions of the PCIe bridge device 109.

In some embodiments of the present inventive concept, the data 203 stored in the memory of the PCIe configuration space 117 may be processed by the modules 205 of the PCIe bridge device 109. The modules 205 may be stored within the memory 119. In an example, the modules 205 communicatively coupled to the processor 115 configured in the PCIe bridge device 109, may also be present outside the memory as shown in FIG. 2A and implemented as hardware or an emulated software PCIe bridge. As used herein, the term modules refer to an application specific integrated circuit (ASIC), an electronic circuit, a processor (e.g., shared, dedicated, or group) and memory that execute one or more software or firmware programs, a combinational logic circuit, and/or other suitable components that provide the described functionality.

In some embodiments of the present inventive concept, the modules 205 may include, for example, a receiving module 221, a detecting module 223, an action performing module 225, a validating module 227, a resetting module 229 and other modules 231. The other modules 231 may be used to perform various miscellaneous functionalities of the PCIe bridge device 109. It will be appreciated that such aforementioned modules 205 may be represented as a single module or a combination of different modules.

In some embodiments of the present inventive concept, the receiving module 221 may initially receive a bridge register value to be written into a bridge register from the virtual machine 105. The bridge register value may be sent to be written by a guest OS installed in the virtual machine 105. The bridge register value indicates one of a "Power ON" condition or a "Power OFF" condition. In some embodiments of the present inventive concept, the bridge register value and the bridge register may be vendor specific. Upon sending the bridge register value, the virtual machine 105, in other words, the emulating and virtualizing unit 103 hosting the virtual machine 105 may receive an interrupt signal. Upon receiving the interrupt signal, the emulating and virtualizing unit 103 hosting the virtual machine 105 may send a request to perform one or more actions corresponding to the bridge register value by tapping the PCIe register. The receiving module 221 may receive the request from the emulating and virtualizing unit 103 and may tap the PCIe register. In some embodiments of the present inventive concept, the bridge register value received from the virtual machine 105 may be stored as the bridge register data 207.

In some embodiments of the present inventive concept, the detecting module 223 may detect a condition associated with the bridge register value by mapping the bridge register value with a pre-stored vendor specific value and a corresponding pre-stored condition. As an example, consider the pre-stored vendor specific value and the corresponding pre-stored condition as shown in the below Table 1.

TABLE 1

| Pre-stored vendor specific value of a bridge register | Condition corresponding to the vendor specific value |
| --- | --- |
| 1 | Power ON |
| 0 | Power OFF |

As an example, assume the bridge register value received by the detecting module 223 is "0". Upon mapping this bridge register value with the pre-stored vendor specific value of the bridge register and the corresponding condition, the detecting module 223, may detect that the received bridge register value "0" refers to a "Power OFF" condition. Similarly, mapping may be performed by the detecting module 223 for the "Power ON" condition as well. The bridge register value and the corresponding condition thus detected may also be stored as the bridge register data 207.

In some embodiments of the present inventive concept, the action performing module 225 may perform the one or more actions corresponding to the detected condition associated with the bridge register value on one or more emulated SSDs 111. The one or more emulated SSDs 111 may be communicatively connected to the virtual machine 105. As an example, the one or more emulated SSDs 111 may include, but are not limited to, NVMe, SATA, SAS, USB and the like. In some embodiments of the present inventive concept, the action performing module 225 may perform the one or more actions on the one or more emulated SSDs ill to emulate one of the "Power ON" condition or the "Power OFF" condition for the one or more emulated SSDs 111. In some embodiments of the present inventive concept, the emulated condition may be the condition detected by the detecting module 223. In some embodiments of the present inventive concept, the one or more actions associated with the "Power ON" condition may include, but are not limited to, creating PCIe capabilities, allocating resources required for Base Address Registers (BARs), as an example BAR0 to BAR5, initializing PCIe registers and controller specific registers with default values as per a specification, performing a controller initialization sequence and exposing PCIe and controller register space to the guest OS of the virtual machine 105. As an example, the PCIe capabilities of 4096 bytes may include but are not limited to, a configuration space including header capability for PCIe express capabilities, Message Signaled Interrupts (MSI)-X capability, power management capability and all other extended capabilities. As an example, initializing control specific registers may include, but are not limited to, initializing controller capability, controller configuration registers and controller status registers. In some embodiments of the present inventive concept, the one or more actions associated with the "Power OFF" condition may include, but are not limited to, removing the PCIe capabilities, revoking MMIO access, transferring outstanding data to a database associated with the virtual machine 105, clearing the controller specific registers, and concealing PCIe and controller register space to the guest OS of the virtual machine 105. The one or more actions associated with the "Power ON" condition and the "Power OFF" condition may be stored as the action data 209.

The present inventive concept is explained below with the help of some example scenarios. However, the following should not be construed as a limitation of the present inventive concept since the present inventive concept may be applicable for other scenarios as well.

Example Scenario 1

Figure 2B:
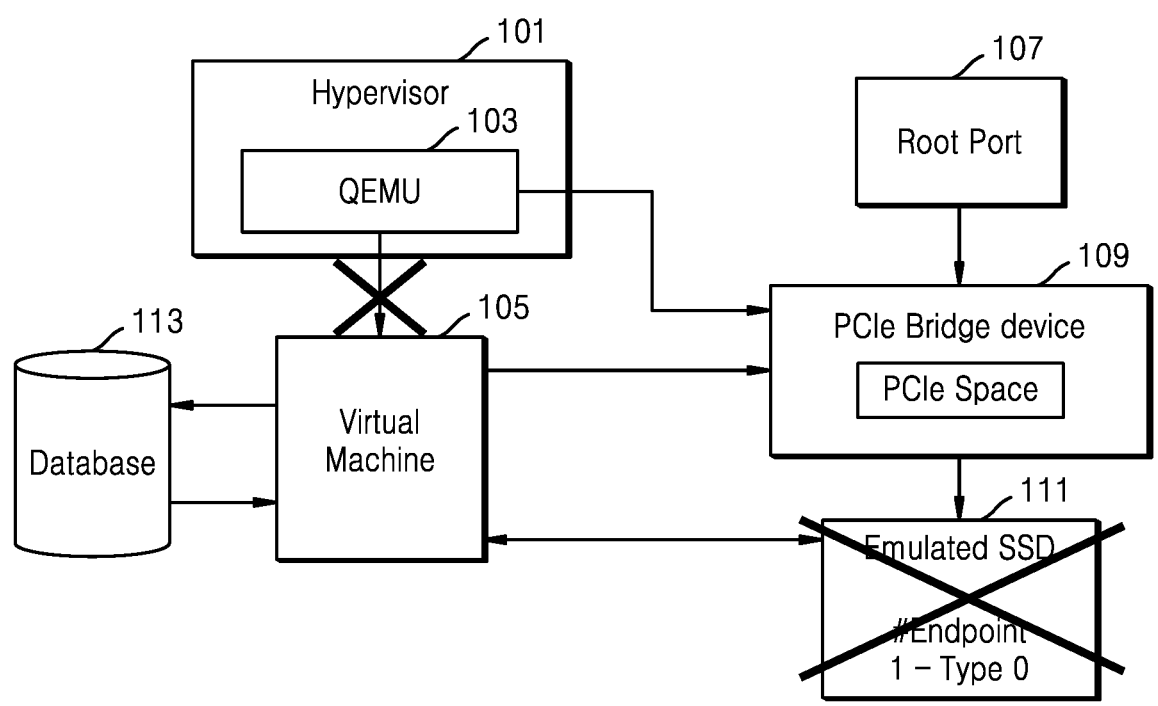
FIG. 2B shows a scenario illustrating validation of the power cycle for an emulated PCIe based storage device such as an emulated SSD during a "Power OFF" condition in accordance with some embodiments of the present inventive concept.

As shown in FIG. 2B, consider an example scenario of a "Power OFF" condition where:
Emulating and virtualizing unit 103 is a Quick Emulator (QEMU);
Emulated SSD 111$_n$ is an Endpoint Device of Type 0. In this scenario, there is only one endpoint device.
PCIe bridge device 109 is of Type 1 having PCIe configuration space.
QEMU 103 uses configurations provided by a hypervisor 101 to host virtual machine 105 installed with a guest OS. The PCIe bridge device 109 may be communicatively connected to the virtual machine 105, and a root port 107 of the PCIe tree. Further, the emulated SSD 111$n$ (e.g., the Type 0 device) may be communicatively connected to the virtual machine 105, and the PCIe bridge device 109 as shown in the FIG. 2B. In this system, the following steps may be performed as shown in the FIG. 2B, to emulate and validate a power cycle of the emulated SSD 111$n$.

Step 1: Virtual machine 105 sends a bridge register value "0" to be written into the bridge register configured in the PCIe configuration space of the PCIe bridge device 109, and the PCIe bridge device 109 receives the bridge register value from the virtual machine 105.

Step 2: QEMU 103 sends a request to the PCIe bridge device 109 to tap the PCIe register and perform one or more actions associated with the received bridge register value.

Step 3: PCIe bridge device 109 detects the condition associated with the bridge register value "0" as a "Power OFF" condition by performing a mapping with the pre-stored vendor specific value and a corresponding pre-stored condition. PCIe bridge device 109 performs the one or more actions related to the detected "Power OFF" condition, to emulate the "Power OFF" condition for the emulated SSD 111$n$. The "Power OFF" condition is pictorially represented by a cross mark in FIG. 2B. In other words, the "Power OFF" condition is pictorially represented by crossing out the emulated SSD 111 in FIG. 2B.

Step 4: As part of the one or more actions, outstanding data related to the emulated SSD 111$n$ is sent to the database 113 associated with the QEMU 103 and the virtual machine 105.

Example Scenario 2

Figure 2C:
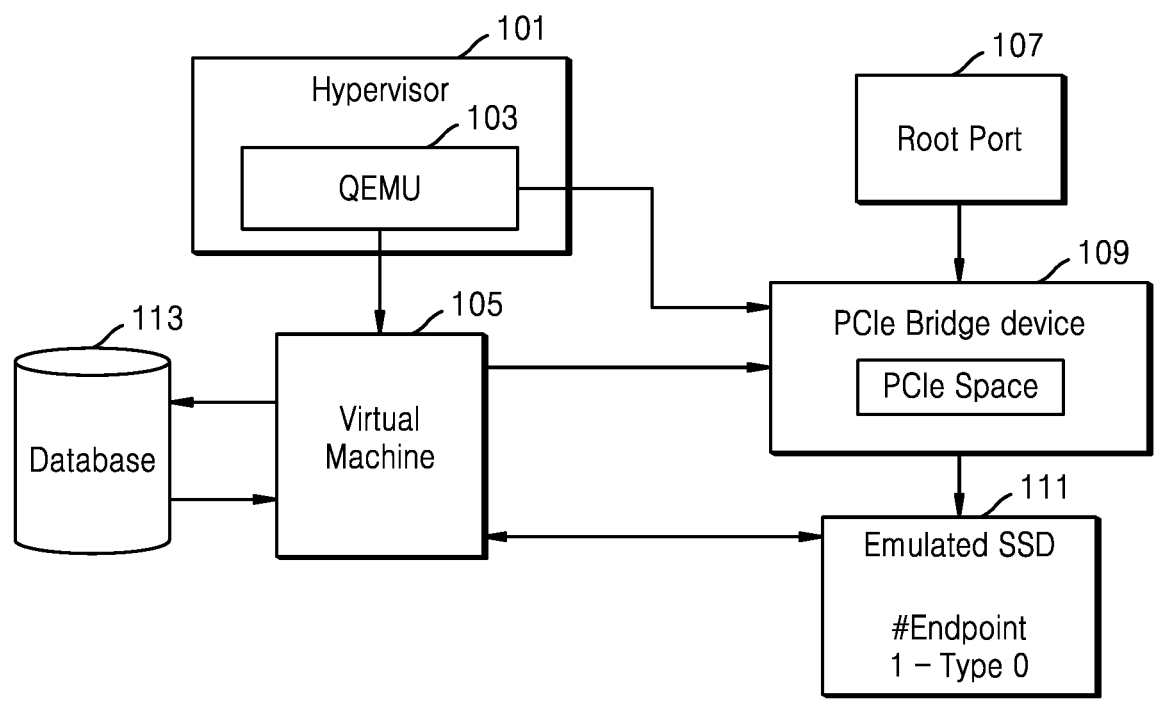
FIG. 2C shows a scenario illustrating validation of the power cycle for an emulated PCIe based storage device such as an emulated SSD during a "Power ON" condition in accordance with some embodiments of the present inventive concept.

As shown in FIG. 2C, the consider an example scenario of a "Power ON" condition where, the components and connections within the system are as explained in example scenario 1.

Using this system, the following steps may be performed as shown in FIG. 2C, to emulate and validate a power cycle of the emulated SSD 111$n$.

Step 1: Virtual machine 105 sends a bridge register value "1" to be written into the bridge register configured in the PCIe configuration space of the PCIe bridge device 109, and the PCIe bridge device 109 receives the bridge register value from the virtual machine 105.

Step 2: QEMU 103 sends a request to the PCIe bridge device 109 to tap the PCIe register and perform one or more actions associated with the received bridge register value.

Step 3: PCIe bridge device 109 detects the condition associated with the bridge register value "1" as a "Power ON" condition by performing a mapping with the pre-stored vendor specific value and a corresponding pre-stored condition. PCIe bridge device 109 performs the one or more actions related to the detected "Power ON" condition, to emulate the "Power ON" condition for the emulated SSD 111$n$. The "Power ON" condition is pictorially represented by removing the cross mark which was shown in FIG. 2B, In other words, the emulated SSD 111 is no longer crossed out.

Figure 3:
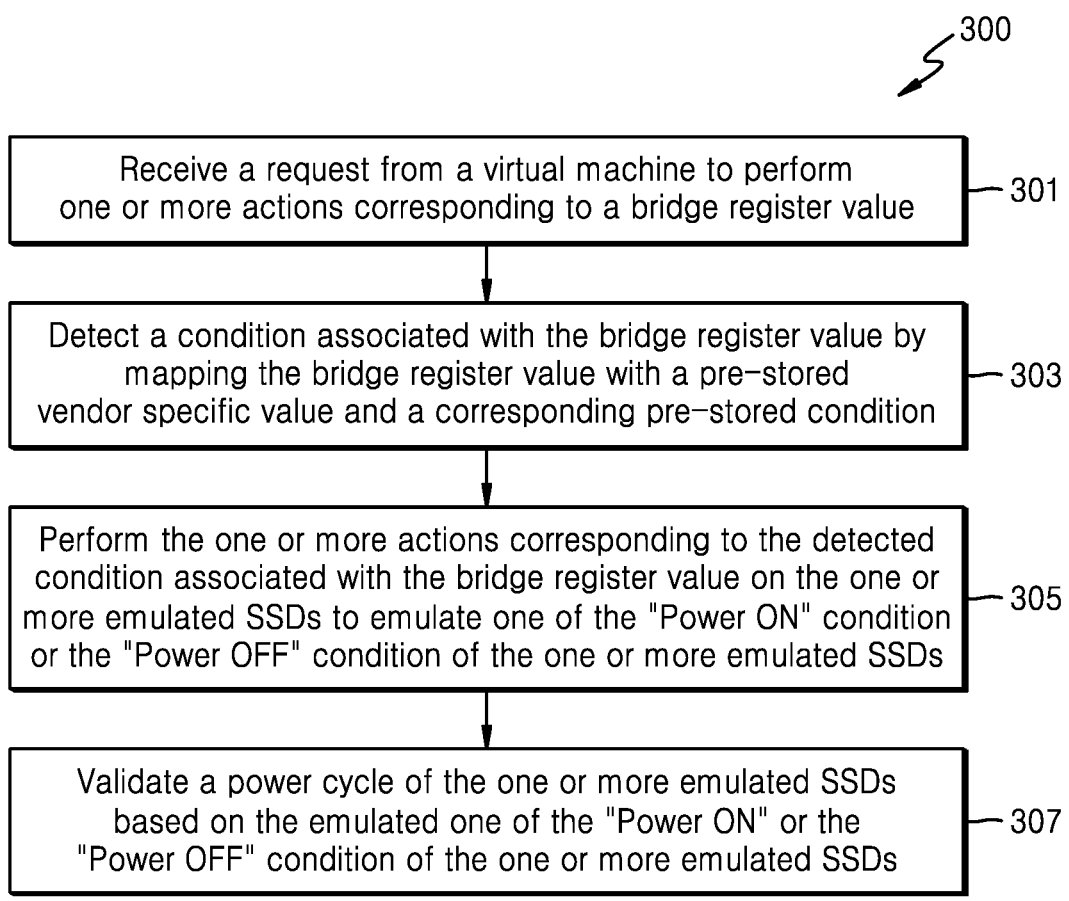
FIG. 3 shows a flowchart illustrating a method of validating a power cycle for an emulated PCIe based storage device such as an emulated SSD in accordance with some embodiments of the present inventive concept; and It should be appreciated by those skilled in the art that any block diagrams, flow charts, flow diagrams, state transition diagrams, pseudo code, and the like represent various processes which may be represented in a computer readable medium and executed by a computer or processor.

FIG. 3 shows a flowchart illustrating a method of validating a power cycle for a PCIe based storage device such as an emulated SSD in accordance with some embodiments of the present inventive concept.

As illustrated in FIG. 3, the method 300 includes one or more blocks illustrating a method of validating a power cycle for an emulated SSD 111$_n$. The method 300 may be described in the context of computer executable instructions. For example, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the present inventive concept described herein. Furthermore, the method 300 can be implemented in any suitable hardware, software, firmware, or combination thereof.

At block 301, the method 300 may include receiving, by a processor 115 of a PCIe bridge device 109 communicatively connected to a virtual machine 105 hosted by an emulating and virtualizing unit 103, a bridge register value to be written into a bridge register from the virtual machine 105. In some embodiments of the present inventive concept, the bridge register value may be one of a "Power ON" condition or a "Power OFF" condition.

More specifically, at block 303, the method 300 may include receiving, by the processor 115, a request from the virtual machine 105 to perform one or more actions corresponding to the bridge register value. In some embodiments of the present inventive concept, upon receiving the request from the virtual machine 105, the processor 115 may tap the PCIe register.

At block 303, the method 300 may include detecting, by the processor 115, a condition associated with the bridge register value by mapping the bridge register value with a pre-stored vendor specific value and a corresponding pre-stored condition.

At block 305, the method 300 may include performing, by the processor 115, the one or more actions corresponding to the detected condition associated with the bridge register value on the one or more emulated SSDs 111 to emulate one of the "Power ON" condition or the "Power OFF" condition for the one or more emulated SSDs 111. As an example, the one or more actions associated with the "Power ON" condition may include, but are not limited to, creating PCIe capabilities, allocating resources required for Base Address Registers (BARs), initializing PCIe registers and controller specific registers with default values as per a specification, performing a controller initialization sequence, and exposing PCIe and controller register space to the guest OS of the virtual machine 105. As an example, the one or more actions associated with the "Power OFF" condition may include, but are not limited to, removing PCIe capabilities, revoking MMIO access, transferring outstanding data to a database 113 associated with the virtual machine 105, clearing controller specific registers, performing a controller un-initialization sequence, and concealing PCIe and controller register space to the guest OS of the virtual machine 105. In some embodiments of the present inventive concept, upon performing the one or more actions associated with the detected condition, the processor 115 may reset the bridge register by clearing the bridge register value written into the bridge register.

At block 307, the method 300 may include validating, by the processor 115, a power cycle of the one or more emulated SSDs 111 based on the pre-stored vendor specific value and the corresponding pre-stored condition for one of the emulated "Power ON" or the "Power OFF" conditions for the one or more emulated SSDs 111.

A description of an embodiment of the present inventive concept with several components in communication with each other does not imply that all such components are required. For example, a variety of optional components are described to illustrate the wide variety of possible embodiments of the present inventive concept. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present inventive concept need not include the device itself.

The specification has described a system and a method for validating a power cycle for a PCIe based storage device. The illustrated steps are set out to explain the embodiments shown, and it should be anticipated that the manner in which particular functions are performed can change. These examples are presented herein for purposes of illustration, and not limitation. Further, the boundaries of the functional building blocks have been set forth herein for the convenience of the description. Alternative boundaries can be set forth so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. In addition, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Here, the embodiments of the present inventive concept are intended to be illustrative, but not limiting, of the scope of the inventive concept, which is set forth in the following claims.

What is claimed is:

1. A system for validating a power cycle for an emulated Peripheral Component Interconnect express (PCIe) based storage device, the system comprising:
    an emulating and virtualizing unit configured to host a virtual machine that includes a guest Operating System (OS);
    a PCIe bridge device communicatively coupled to the virtual machine; and
    one or more emulated PCIe based storage devices communicatively coupled to the PCIe bridge device, wherein the PCIe bridge device is configured to:
        receive a bridge register value to be written into a bridge register from the virtual machine, wherein the bridge register value indicates a "Power ON" condition or a "Power OFF" condition;
        receive a request from the virtual machine to perform one or more actions corresponding to the bridge register value;
        detect a condition associated with the bridge register value by mapping the bridge register value with a pre-stored vendor value and a corresponding pre-stored condition;
        perform the one or more actions corresponding to the detected condition associated with the bridge register value on the one or more emulated PCIe based storage devices to emulate the "Power ON" condition or the "Power OFF" condition for the one or more emulated PCIe based storage devices; and
        validate a power cycle of the one or more emulated PCIe based storage devices based on the pre-stored vendor value and the corresponding pre-stored condition for the emulated "Power ON" condition or the "Power OFF" condition for the one or more emulated PCIe based storage devices.

2. The system as claimed in claim 1, wherein the one or more actions associated with the "Power ON" condition comprises at least one of creating PCIe capabilities, allocating resources required for Base Address Registers (BARs), initializing PCIe registers and controller specific registers with default values as per a specification, performing controller initialization sequence, or exposing PCIe and controller register space to the guest OS.

3. The system as claimed in claim 1, wherein the one or more actions associated with the "Power OFF" condition comprises at least one of removing PCIe capabilities, revoking Memory Mapped Input/Output (MMIO) access, transferring outstanding data to a database associated with the virtual machine, clearing controller specific registers, performing a controller un-initialization sequence or concealing PCIe and controller register space to the guest OS.

4. The system as claimed in claim 1, wherein the PCIe bridge device is further configured to reset the bridge register by clearing the bridge register value written into the bridge register.

5. A method of validating a power cycle for an emulated Peripheral Component Interconnect express (PCIe) based storage device, the method comprising:
    receiving, at a PCIe bridge device communicatively coupled to a virtual machine hosted by an emulating and virtualizing unit, a bridge register value to be written into a bridge register from the virtual machine, wherein the bridge register value indicates a "Power ON" condition or a "Power OFF" condition;
    receiving, at the PCIe bridge device, a request from the virtual machine to perform one or more actions corresponding to the bridge register value;

detecting, by the PCIe bridge device, a condition associated with the bridge register value by mapping the bridge register value with a pre-stored vendor value and a corresponding pre-stored condition;

performing, by the PCIe bridge device, the one or more actions corresponding to the detected condition associated with the bridge register value on one or more emulated PCIe based storage devices communicatively coupled to the PCIe bridge device, to emulate the "Power ON" condition or the "Power OFF" condition for the one or more emulated PCIe based storage devices; and validating, by the PCIe bridge device, a power cycle of the one or more emulated PCIe based storage devices based on the pre-stored vendor value and the corresponding pre-stored condition for the emulated "Power ON" condition or the "Power OFF" condition for the one or more emulated PCIe based storage devices.

6. The method as claimed in claim 5, wherein the virtual machine includes a guest Operating System (OS).

7. The method as claimed in claim 5, wherein the one or more actions associated with the "Power ON" condition comprises at least one of creating PCIe capabilities, allocating resources required for Base Address Registers (BARs), initializing PCI registers and controller specific registers with default values as per a specification, performing a controller initialization sequence or exposing PCI and controller register space to a guest Operating System (OS) of the virtual machine.

8. The method as claimed in claim 5, wherein the one or more actions associated with the "Power OFF" condition comprises at least one of removing PCIe capabilities, revoking Memory Mapped Input/Output (MMIO) access, transferring outstanding data to a database associated with the virtual machine, clearing controller specific registers, performing a controller un-initialization sequence or concealing PCI and controller register space to a guest Operating System (OS) of the virtual machine.

9. The method as claimed in claim 5, further comprising resetting, by the PCIe bridge device, the bridge register by clearing the bridge register value written into the bridge register.

* * * * *